US007816002B2

(12) United States Patent
Matsuda et al.

(10) Patent No.: US 7,816,002 B2
(45) Date of Patent: Oct. 19, 2010

(54) RECORDING PAPER

(75) Inventors: Tsukasa Matsuda, Kanagawa (JP); Eizo Kurihara, Kanagawa (JP); Mario Fuse, Kanagawa (JP); Shoji Yamaguchi, Kanagawa (JP); Kunihiro Takahashi, Kanagawa (JP); Tomofumi Tokiyoshi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 220 days.

(21) Appl. No.: 11/939,294

(22) Filed: Nov. 13, 2007

(65) Prior Publication Data

US 2008/0226849 A1 Sep. 18, 2008

(30) Foreign Application Priority Data

Mar. 12, 2007 (JP) ............................ 2007-062347

(51) Int. Cl.
*B32B 5/16* (2006.01)
*B32B 21/06* (2006.01)
*D21H 13/00* (2006.01)

(52) U.S. Cl. ....................... 428/326; 428/328; 428/535; 428/900; 162/104; 162/105; 162/138; 162/148

(58) Field of Classification Search ................. 162/138, 162/140, 104, 105; 283/82; 340/572.1, 572.6; 428/201, 211.1, 900, 916, 326, 328, 535
See application file for complete search history.

(56) References Cited

U.S. PATENT DOCUMENTS 4,660,025 A * 4/1987 Humphrey ............... 340/572.2
4,964,951 A * 10/1990 Menyhert ................... 162/140
5,541,002 A * 7/1996 Hosoi et al. .............. 428/537.5
5,583,333 A * 12/1996 Hoshino et al. ............ 235/493
5,650,236 A * 7/1997 Hirano et al. ............... 428/611
5,873,978 A * 2/1999 Kuroyama et al. .......... 162/135
6,585,857 B2 * 7/2003 Ruhrig ....................... 162/123
6,786,586 B2 * 9/2004 Koga et al. ..................... 347/95
2007/0014973 A1 * 1/2007 Koda et al. ............... 428/195.1
2007/0146765 A1 * 6/2007 Matsuda et al. ............ 358/1.14
2007/0243403 A1 * 10/2007 Matsuda et al. ............ 428/611
2008/0013212 A1 * 1/2008 Fuse et al. .................. 360/131
2008/0018674 A1 * 1/2008 Matsuda et al. ............ 346/74.4
2008/0227010 A1 * 9/2008 Kurihara et al. ............. 430/104
2009/0017334 A1 * 1/2009 Kurihara et al. ............. 428/800

FOREIGN PATENT DOCUMENTS

JP 7-032778 2/1995
JP 10-143708 5/1998
JP 2004-284053 10/2004
JP 2004-285524 10/2004

* cited by examiner

*Primary Examiner*—Mark Ruthkosky
*Assistant Examiner*—Gerard T Higgins
(74) *Attorney, Agent, or Firm*—Morgan, Lewis & Bockius LLP

(57) ABSTRACT

A recording paper contains a pulp fiber and a magnetic fiber having a large Barkhausen effect. The fiber orientation ratio of this recording paper by an ultrasonic propagation velocity method is in a range of more than 1.3 to less than 1.8, and the degree of shrinkage in an MD thereof is 0.25% or less.

7 Claims, 4 Drawing Sheets

RECORDING PAPER

CROSS-REFERENCE TO RELATED APPLICATION

This application is based on and claims priority under 35 USC 119 from Japanese Patent Application No. 2007-62347 filed Mar. 12, 2007.

BACKGROUND

1. Technical Field

The present invention relates to a recording paper on which printing can be performed by general recording materials such as a toner and ink, and which contains a magnetic material for emitting a signal that is detectable by a detection device.

2. Related Art

Printed matter and documents containing a magnetic material that is detectable by a magnetic detector have conventionally been studied for the purpose of preventing forgery and affirming the validity of printed information.

SUMMARY

An aspect of a recording paper of the present invention is characterized by containing a pulp fiber and a magnetic fiber having a large Barkhausen effect, and in that fiber orientation ratio by an ultrasonic propagation velocity method is in a range of from more than approximately 1.3 to less than approximately 1.8, and a degree of shrinkage in an MD is approximately 0.25% or less.

BRIEF DESCRIPTION OF THE DRAWINGS

An exemplary embodiment of the present invention will be described in detail based on the following figures, wherein:

FIG. 2A is a graph showing B-H characteristics;

FIG. 2B is a graph showing an electric current passing through a detecting coil in the case of causing an alternating magnetic field by an exciting coil; a vertical axis of a graph in the upper row denotes a magnetic coercive force, a vertical axis of a graph in the lower row denotes an electric current, and a horizontal axis of a graph in the upper row and a graph in the lower row denotes time;

FIG. 2C is a graph showing an electric current detected by a detecting coil; a vertical axis thereof denotes an electric current, and a horizontal axis thereof denotes time;

FIG. 3A is a front view of the detecting gate;

FIG. 3B is a side view in the case of observing one detector composing the detecting gate from a side face (in the case of observing from the arrow X direction in FIG. 3A);

FIG. 3C is a top view in the case of observing one detector composing the detecting gate from above (in the case of observing from the arrow Y direction in FIG. 3A)

DETAILED DESCRIPTION

<Regarding Temporary Deterioration of Pulse Signal Intensity Immediately After Forming an Image>

In order that the presence of papers can be confirmed even immediately after forming an image by electrophotography, the inventors of the invention have earnestly studied a phenomenon in which a pulse signal is temporarily detected with difficulty immediately after forming the image in the case where the image is formed by electrophotography on the papers containing magnetic fiber having a large Barkhausen effect.

Thus, the inventors of the invention have first examined intensity change of the pulse signal detected from the papers before and after forming the image. As a result, it has been found that pulse signal intensity changes as shown in FIG. 1.

Figure 1:
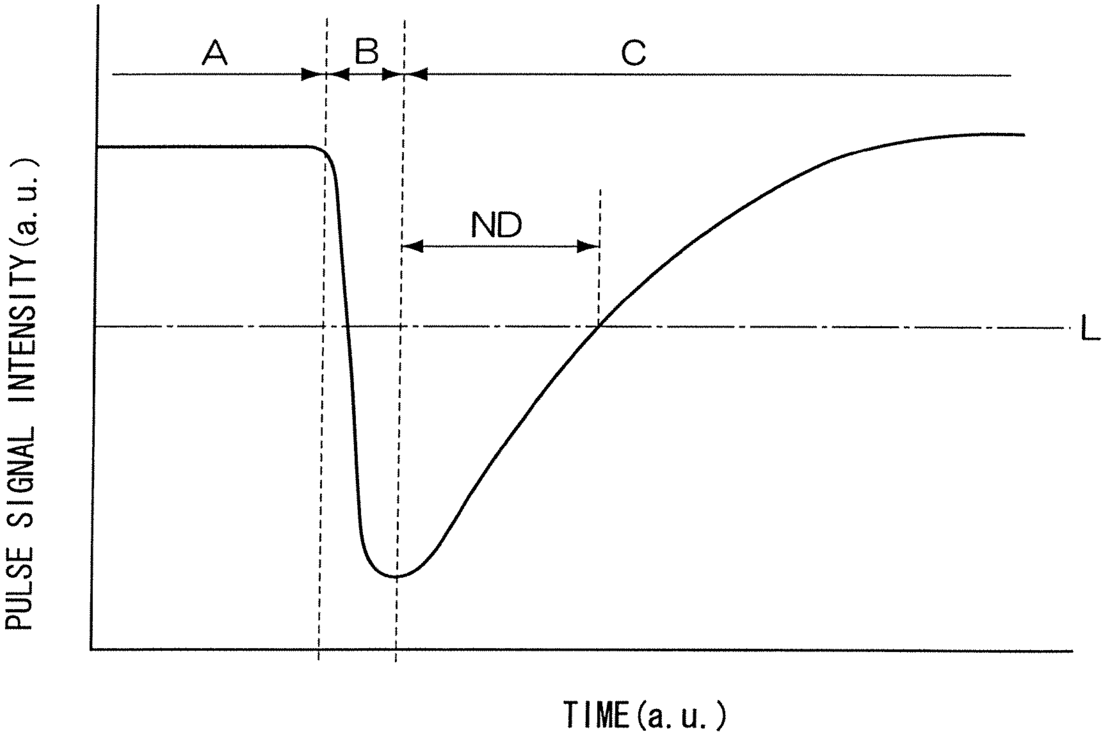
FIG. 1 is a graph showing one example of intensity change of a pulse signal detected from a paper before and after forming an image.

FIG. 1 is a graph showing one example of intensity change of the pulse signal detected from the papers before and after forming the image. In FIG. 1, a horizontal axis denotes time, a vertical axis denotes intensity of the detected pulse signal and a section denoted by a mark A signifies a state before fusing. A section denoted by a mark B signifies a state during fusing (a state in which the papers are passing through a fusing machine while heated) and a section denoted by a mark C signifies a state after fusing (after forming the image). A section denoted by a mark ND signifies a state in which the pulse signal is detected with difficulty by a detection device (or a state in which pulse signal intensity is on a predetermined level or less, so that the detection device sometime recognizes the papers to be absent).

A solid line denotes change of pulse signal intensity with respect to time at one specific point in a detection area of the detection device. An alternate long and short dash line denoted by a mark L signifies detection limit intensity of the pulse signal at one specific point in a detection area of the detection device (or detection determination intensity such that whether the presence of the papers is detected or not is determined from detected pulse signal intensity to emit a detection signal such as an alarm in the case of determining the papers to be detected). The presence of the section ND and the length thereof depend on a constitution of the detection device and yet vary ordinarily with a position in a detection area of the detection device.

As clarified from FIG. 1, at one specific point in a detection area of the detection device, pulse signal intensity is abruptly lowered during fusing to detection limit intensity (or detection determination intensity) or less, and gradually increased (recovered) after fusing to detection limit intensity (or detection determination intensity) or more again in a while (passing through the section ND). Thus, even though the presence of the papers with the image formed on attempts to be confirmed by the detection device, a region where the papers can not be detected spreads in a detection area for a while after fusing. Thus, in the case where the papers pass relatively through an optional position in a detection area, detection probability is decreased.

From the above, in order to restrain detection accuracy of the papers from deteriorating (reduction of detection probability and/or spreading of the undetectable region in a detection area) even immediately after the image is formed by electrophotography on the papers containing magnetic fiber, a method is proposed so as to determine detection limit intensity (or detection determination intensity) so that the papers can be detected even at a point of time when pulse signal intensity immediately after forming the image shows the local minimum value. However, this method actually lacks practicability. The reason therefor is that the detection device picks up a noise signal so easily as to increase a malfunction of the detection device, and specs of the detection device need to be improved so that even a considerably feeble pulse signal can be detected. Also, a method is conceived such as to add more magnetic fiber to the papers. However, in this method, irregularities resulting from magnetic fiber are caused on a paper surface, so that defect of transcription resulting from these irregularities is occasionally caused easily during forming the image.

Therefore, a method of restraining pulse signal intensity from temporarily deteriorating during fusing is conceived to be most effective from such a viewpoint.

On the other hand, it is known that when a sheet in which paper stuff slurry containing pulp fiber is subject to paper-making is dried in the step of producing the papers, the pulp fiber in the sheet shows a change that the fiber entirely contracts while restricted to itself during dehydration by the formation of hydrogen bond and the like.

This contraction behavior is caused similarly by short-time heating during forming the image (fusing), which promotes evaporation of moisture in the papers, and is conceived to become more notable particularly in the case where change of moisture content in the papers before and after fusing is great (for example, during both-side printing in which the papers are heated to higher temperature as compared with one-side printing, and the case where the papers before fusing are left for a long time under a high-humidity environment). Contraction stress caused in the papers by fusing is conceived to gradually relax according as the papers absorb moisture in an atmosphere after fusing.

The inventors of the invention have conceived that abrupt occurrence of contraction stress and the following sluggish relaxing process in accordance with the above-mentioned dehumidification-moisture absorption change of the papers before and after fusing tend to coincide with the process of change of pulse signal intensity exemplified in FIG. 1, so that contraction stress caused in the papers affects magnetic fiber to bring the change of pulse signal intensity exemplified in FIG. 1.

During both-side printing in which the occurrence of contraction stress in the papers becomes more notable, and in the case of fusing the papers in a state of being left for a long time under a high-humidity environment so as to have high moisture content, temporary deterioration of pulse signal intensity after fusing becomes more notable. Therefore, it is assumed that intensity of contraction stress caused in the papers during fusing, namely, intensity of stress applied to magnetic fiber existing in the papers is in correlation with the deterioration of pulse signal intensity.

Thus, the inventors of the invention have conceived that even though contraction stress is caused in the papers during fusing, it is important that this contraction stress is applied to magnetic fiber with as less concentration as possible in order to restrain pulse signal intensity from temporarily deteriorating immediately after fusing.

On the other hand, it is conceived that the above-mentioned stress concentration on magnetic fiber is notable in the case where the oriented state of pulp fiber is more uniform in the same direction. The above shows that the oriented state of pulp fiber is appropriately random basically.

However during moisture absorption/dehumidification, expansion and contraction of pulp fiber in the case of noting one pulp fiber are larger in the shorter direction of pulp fiber than in the longer direction. Thus, when the oriented state of pulp fiber becomes more random, contraction of the papers in a flow direction of pulp fiber during producing the papers, namely, the MD(Machine Direction) becomes larger during fusing. Thus, when the oriented state of pulp fiber is remarkably randomized, the effect of restraining contraction stress caused in the papers during fusing is not merely canceled out but also conversely contraction stress caused in the MD becomes large; consequently, it is anticipated that pulse signal intensity immediately after fusing can not be restrained from temporarily deteriorating. Thus, the inventors of the invention have conceived that it is also important to restrain degree of shrinkage in the MD to a certain level or less.

<Transfer Paper for Electrophotographs>

The inventors of the invention have found out the following invention on the basis of the above knowledge.

That is to say, a recording paper of the invention is characterized by containing a pulp fiber and a magnetic fiber having a large Barkhausen effect, and in that fiber orientation ratio by an ultrasonic propagation velocity method is in a range of from more than approximately 1.3 to less than approximately 1.8, and a degree of shrinkage in an MD is approximately 0.25% or less.

Accordingly, the invention can provide a recording paper in which signal intensity resulting from the magnetic fiber can be restrained from temporarily deteriorating even immediately after forming an image by electrophotography.

A recording paper of the invention is appropriately used as a transfer paper for electrophotographs from the viewpoint of obtaining the above-mentioned effect, and is not limited thereto but can be utilized for a known recording method, for example, naturally as a recording paper for ink jet.

With regard to a recording paper of the invention, fiber orientation ratio thereof needs to be in a range of more than approximately 1.3 and less than approximately 1.8, preferably in a range of more than approximately 1.35 and less than approximately 1.7, and more preferably in a range of more than approximately 1.4 and less than approximately 1.7.

With regard to fiber orientation ratio in a range of 1.3 or less, in which pulp fiber is oriented more randomly, the effect such that the stress concentrates on magnetic fiber by the increase of contraction stress in the MD resulting from contraction of the shorter direction component of individual pulp fiber in papers by heating during fusing becomes relatively larger than the effect such that the concentration of contraction stress caused in papers by heating during fusing on magnetic fiber is relaxed by the randomization of orientation of pulp fiber. Consequently, on the whole, the stress is more concentrated on the magnetic fiber. Further a remarkable deterioration of the temporary signal intensity occurs immediately after forming the image. Therefore, detection accuracy of the papers easily deteriorates immediately after forming the image.

On the contrary, with regard to fiber orientation ratio in a range of 1.8 or more, in which pulp fiber is oriented more in one direction, contraction stress caused in papers by heating during fusing is applied to magnetic fiber with concentration. Thus, remarkable deterioration of signal intensity is temporarily caused immediately after forming the image. Therefore, detection accuracy of the papers easily deteriorates immediately after forming the image.

A method of adjusting fiber orientation ratio to a range of from more than approximately 1.3 to less than approximately 1.8 is not particularly limited, and yet examples thereof include a method of adjusting jet wire ratio (feed speed of wire in a paper machine/discharge pressure (or discharge speed) in discharging paper stuff slurry containing at least pulp fiber into the wire). In this case, jet wire ratio can not be specified unconditionally by reason of depending on other various paper producing conditions and paper machines to be used, but can properly be selected in consideration of the paper producing conditions and paper machines to be used.

Examples of a method except the method of adjusting jet wire ratio include a method of adjusting rotational speed of an orb web cylinder by slowing than usual in the case of paper-making of a cylinder type in preparing the papers.

In the invention, fiber orientation ratio signifies a value measured by utilizing an ultrasonic propagation velocity method, and is represented as a value obtained by dividing ultrasonic propagation velocity in the MD of a recording paper (the traveling direction of a paper machine) by ultrasonic propagation velocity in the CD(Cross direction) of a recording paper (the direction orthogonal to the traveling direction of a paper machine), being specifically represented by the following expression (1).

fiber orientation ratio of a recording paper by an ultrasonic propagation velocity method (*T/Y* ratio)= *MD* ultrasonic propagation velocity/*CD* ultrasonic propagation velocity  Expression (1)

This fiber orientation ratio by the ultrasonic propagation velocity method can be measured by using Sonic Sheet Tester (manufactured by NOMURA SHOJI CO., LTD.). The lower limit of a value capable of being offered by fiber orientation ratio in this case is 1.0.

On the other hand, degree of shrinkage in the MD needs to be approximately 0.25% or less, preferably approximately 0.24% or less.

Even in the case where fiber orientation ratio is in a range of from more than approximately 1.3 to less than approximately 1.8, a degree of shrinkage in the MD of more than approximately 0.25% increases contraction stress in the MD caused in papers by heating during fusing, so that the stress concentrates more on magnetic fiber. Thus, remarkable deterioration of signal intensity is temporarily caused immediately after forming the image. Therefore, detection accuracy of the papers easily deteriorates immediately after forming the image. On the other hand, the lower limit value of degree of shrinkage in the MD is not particularly limited but yet preferably approximately 0.10% or more practically.

In the invention, degree of shrinkage in the MD was calculated in the following manner.

First, a rectangular paper (15 mm×120 mm) obtained so that the MD of a recording paper became the longer direction was prepared. Next, in this rectangular paper, portions 10 mm distant from both ends in the longer direction were each held by a metal chuck so that the longer direction became the vertical direction; the metal chuck at the upper end of the rectangular paper was immovably fixed and the metal chuck at the lower end thereof was mounted with such a weight as to apply a load of 20 g. Subsequently, the rectangular paper was sequentially left under the environment shown in the following environmental conditions (1) to (4), and controlled in humidity to repeat 3 cycles, regarding (1) to (4) as 1 cycle. The humidity control time in each of the temperature and humidity conditions was determined at 1 hour or more at the minimum on any of the conditions (1) to (4) in order to completely control the rectangular paper in humidity, and the time required for modifying the environmental conditions (1) to (2), (2) to (3), (3) to (4) and (4) to (1) was determined at 0.5 hour.

—Leaving Environmental Conditions of a Rectangular Paper—

(1) 23° C. 65% RH
(2) 23° C. 40% RH
(3) 23° C. 65% RH
(4) 23° C. 90% RH

Here, degree of shrinkage in the MD was calculated by the following expression (2).

$$\text{degree of shrinkage in the } MD\ (\%) = 100 \times (L31 - L32)/L11 \quad \text{Expression (2)}$$

In the Expression (2), L31 denotes actual size (mm) of the rectangular paper in the longer direction after being controlled in humidity under the environment of 23° C. 65% RH in the third cycle (just before shifting from the environmental condition (1) to the environmental condition (2)). L32 denotes actual size (mm) of the rectangular paper in the longer direction after being controlled in humidity under the environment of 23° C. 40% RH in the third cycle (just before shifting from the environmental condition (2) to the environmental condition (3)). L11 denotes actual size (nm) of the rectangular paper in the longer direction after being controlled in humidity under the environment of 23° C. 65% RH in the first cycle (just before shifting from the environmental condition (1) to the environmental condition (2)). The actual size of the rectangular paper in the longer direction was measured by measuring displacement amount of the metal chuck holding the lower end of the rectangular paper with an eddy-current sensor (AH-416, manufactured by KEYENCE CORPORATION)

A method of adjusting degree of shrinkage in the MD direction to approximately 0.25% or less is not particularly limited, and yet pulp fiber having high freeness is preferably used in preparing the papers; specifically, preferably pulp fiber adjusted to a freeness of 400 ml/C.S.F (Canadian Standard Freeness) or more, more preferably pulp fiber adjusted to a freeness of 450 ml/C.S.F or more. The upper limit of freeness is not particularly limited but yet appropriately 550 ml/C.S.F or less practically.

Next, components, producing methods and physical properties of a recording paper of the invention are described in further detail.

—Magnetic Fiber—

Figure 2A:
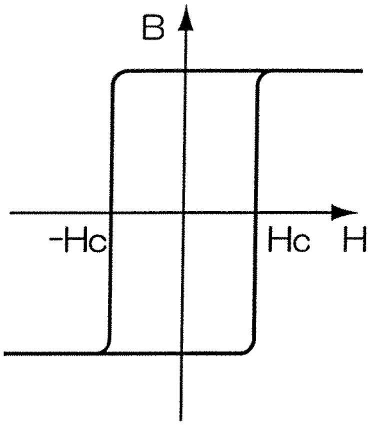
FIGS. 2A to 2C are illustrations for describing a large Barkhausen effect.

Magnetic fiber contained in a recording paper of the invention has a large Barkhausen effect. Here, a large Barkhausen effect is simply described. FIG. 2 is a view for describing a large Barkhausen effect. A Large Barkhausen effect is a phenomenon in which steep magnetization reversal is caused in placing in an alternating magnetic field a material having B-H characteristics as shown in FIG. 2(A), namely, approximately rectangular hysteresis loop and comparatively small magnetic coercive force (Hc), such as amorphous magnetic fiber made of Co—Fe—Ni—B—Si. Thus, when an alternating current passes through an exciting coil to cause an alternating magnetic field, in which magnetic fiber is placed, a pulsed current passes through a detecting coil disposed in the proximity of the magnetic fiber during magnetization reversal.

Figure 2B:
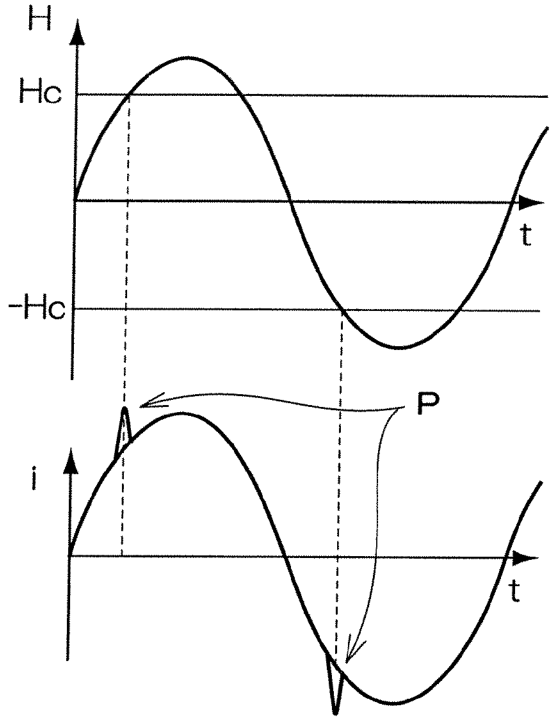

For example, in the case where an alternating magnetic field as shown in the upper row of FIG. 2(B) is caused by an exciting coil, a pulsed current as shown in the lower row of FIG. 2(B) passes through a detecting coil. In FIG. 2(B), a peak denoted by a mark P represents a pulsed current in accordance with magnetization reversal.

Figure 2C:
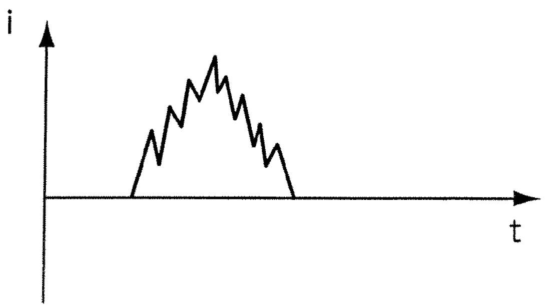

However, an alternating current induced by an alternating magnetic field also passes through a detecting coil. Thus, a pulsed current is detected with superposition on this alternating current. In the case of placing a matter containing plural magnetic fibers in an alternating magnetic field, plural pulsed currents are superposed to detect an electric current as shown in FIG. 2(C).

General examples of a magnetic material composing magnetic fiber contained inside a recording paper of the invention include permanent magnets such as a rare-earth substance having neodymium (Nd)-iron (Fe)-boron (B) as the main component, a magnetic material having samarium (Sm)-cobalt (Co) as the main component, a alnico magnetic material having aluminum (Al)-nickel (Ni)-cobalt (Co) as the main component, and a ferritic magnetic material having barium (Ba) or strontium (Sr) and ferric oxide ($Fe_2O_3$) as the main component, and additionally a soft magnetic material and an oxide soft magnetic material; an amorphous magnetic material having a basic composition of Fe—Co—Si and Co—Fe—Ni is preferably used.

The shape of magnetic fiber is not particularly limited if an oblong shape (linear) suitable for causing a large Barkhausen effect, but yet predetermined length with respect to cross-sectional area is necessary for causing a large Barkhausen effect, so that wire and band shapes are basically preferable. Magnetic fiber has a wire shape more preferably from the viewpoint of further decreasing contact area with pulp fiber to propagate contractive force of a pulp fiber layer with difficulty; particularly preferably, the cross-sectional form is substantially a perfect circle shape.

In the case where magnetic fiber has a wire shape, as described above, the diameter thereof is preferably 10 μm or more, more preferably 20 μm or more, for causing a large Barkhausen effect. The largest diameter thereof is not particularly limited but preferably 80 μm or less, more preferably 60 μm or less, for being contained in ordinary paper.

The length of magnetic fiber is preferably 10 mm or more, more preferably 15 mm or more, for causing a large Barkhausen effect. The largest length of magnetic fiber is preferably 350 mm or less, more preferably 50 mm or less, from the viewpoint of papermaking.

With regard to the diameter and length of magnetic fiber, the diameter and length of all magnetic fibers contained in a recording paper preferably satisfy the above-mentioned range, and in the case where values have distribution, the average value thereof preferably satisfies the above-mentioned range.

-Detection Method and Detection Device of a Recording Paper-

The above-mentioned magnetic fiber is contained in a recording paper of the invention, and thereby an electric signal (such as a pulse signal exemplified in FIG. 2) caused in a magnetic material in the case of placing the paper in a magnetic field is detected by a detection device, so that the presence of the recording paper can be confirmed.

With regard to a detection device, constitution and use mode thereof are not particularly limited if the device can detect the above-mentioned electric signal in any form. In the invention, however, it is appropriate to use a detection device (occasionally referred to as "a detecting gate" hereinafter) composed of a pair of non-contact type detection units disposed with fixation in a predetermined position so as to have a width in which a human being can pass.

In this detecting gate, a detection area is formed between a pair of the detection units. Thus, the presence of the recording paper can be sensed when the recording paper of the invention passes through the detecting gate. In the case of detecting the presence of the recording paper by utilizing this detecting gate, for examples, this detecting gate can be utilized for use such as the prevention of unjust copy and unjust transfer outside of extra sensitive information formed in the paper as an image. However, the recording paper of the invention is not limited only to utilization in the above-mentioned use.

-Paper Base-

Next, a paper base is described. A recording paper of the invention has a paper base containing a pulp fiber in addition to a magnetic fiber as the main component. A paper base may contain various materials used for ordinary paper media, as required in addition thereto. A paper base may be composed of two or more layers, and at least one side of a paper base can be provided with a surface layer such as a pigment coating layer, as required.

Pulp fiber used as the main component of a paper base is not particularly limited; for example, the following are preferably used: kraft pulp fiber of a broadleaf tree and/or a coniferous tree, sulfite pulp fiber, semichemical pulp fiber, chemiground pulp fiber, groundwood pulp fiber, refiner ground pulp fiber and thermomechanical pulp fiber. Fiber such that cellulose or hemicellulose in these fibers is chemically modified can also be used as required.

In addition, each of cotton pulp fiber, hemp pulp fiber, kenaf pulp fiber, bagasse pulp fiber, viscose rayon fiber, regenerated cellulosic fiber, cuprammonium rayon fiber, cellulose acetate fiber, polyvinyl chloride fiber, polyacrylonitrile fiber, polyvinyl alcohol fiber, polyvinylidene chloride fiber, polyolefin fiber, polyurethane fiber, fluorocarbon fiber, glass fiber, carbon fiber, alumina fiber, metal fiber and silicon carbide fiber can be used singly or in a combination of plurality thereof.

Fiber obtained by impregnating or heat-sealing the above-mentioned pulp fiber with synthetic resins such as polyethylene, polypropylene, polystyrene, polyvinyl chloride and polyester may be used as required.

Also, the above-mentioned pulp fiber can further be blended with fine-quality and medium-quality old paper pulp. The blending quantity of old paper pulp is determined in accordance with use, purpose and the like. For example, in the case of blending old paper pulp from the viewpoint of resource protection, the old paper pulp is preferably blended by 10% by mass or more, more preferably 30% by mass or more, with respect to all pulp fibers contained in a paper base. Further, pulp obtained from a certified forest, tree plantations or thinned lumber chips is preferably used from the viewpoint of resource conservation.

In addition, in the case of using LBKP (hardwood bleached kraft pulp) and NBKP (softwood bleached kraft pulp), the mass ratio of LBKP:NBKP is preferably 7:3 to 10:0. The reason therefor is that a paper layer prepared by NBKP as flat and long fiber is increased in degree of shrinkage.

In order to adjust opacity, whiteness and surface nature, a filler can be added as required to a paper base used for a recording paper of the invention.

The content of a filler in a recording paper is not particularly limited and a filler need not necessarily be contained in a recording paper. However, the content of a filler is preferably 3% by mass or more, more preferably 5% by mass or more, from the viewpoint of relaxing contraction stress caused in a recording paper by heating during fusing to restrain the stress from concentrating on magnetic fiber.

The upper limit value of the content of a filler in this case is not particularly limited but yet preferably 10% by mass or less practically.

The kind of a filler usable for the above-mentioned paper base is not particularly limited; the following are usable: calcium carbonate fillers such as ground calcium carbonate, precipitated calcium carbonate and chalk, silicas such as kaoline, calcined clay, pyrophillite, sericite and talc, inorganic fillers such as titanium dioxide, calcium sulfate, barium sulfate, zinc oxide, zinc sulfide, zinc carbonate, aluminum silicate, calcium silicate, magnesium silicate, synthetic silica, aluminum hydroxide, alumina, white carbon, saponite, dolomite, calcium montmorillonite, sodium montmorillonite and bentonite, and organic fillers such as acrylic plastic pigment, polyethylene, chitosan particles, cellulose particles, polyamino acid particles and styrene. The blending of calcium carbonate in alkaline papermaking is preferable from the viewpoint of improving image quality maintenance and brightness in electrophotography.

In addition, various chemicals such as a sizing agent can be internally or externally added to the paper base composing a recording paper of the invention.

Examples of kinds of a sizing agent capable of being added to the paper base include sizing agents such as rosin sizing agent, synthetic sizing agent, petroleum resin sizing agent and neutral sizing agent. Sizing agents such as aluminium sulfate and cationized starch may further be used in combination with a fixing agent.

Neutral sizing agents such as alkenyl succinicanhydride sizing agent, alkylketene dimer, alkenylketene dimer, neutral rosin, petroleum size, olefin resin and styrene-acrylic resin are preferably used among the above-mentioned sizing agents from the viewpoint of preservability of a recording paper after forming an image in an image forming device of electrophotographic mode. Surface sizing agents such as oxidized modified starch, enzyme modified starch, polyvinyl alcohol, cellulose denaturant such as carboxymethyl cellulose, styrene-acrylic latex, styrene-maleic latex and acrylic latex can be used singly or in combination.

In addition, a paper strength additives can be internally or externally added to the paper base composing a recording paper of the invention.

Examples of a paper strength additives include starch, modified starch, gum oleoresin, carboxymethyl cellulose, polyvinyl alcohol, modified polyvinyl alcohol, polyacrylamide, styrene-maleicanhydride copolymer, vinyl chloride-vinyl acetate copolymer, styrene-butadiene copolymer, polyacrylate, urea-formaldehyde resin, melamine-formaldehyde resin, dialdehyde starch, polyethyleneimine, epoxidized polyamide, polyamide-epichlorohydrin resin, methylolated polyamide and chitosan derivative; these materials can be used singly or by mixture.

In addition thereto, various auxiliary agents blended with ordinary paper media, such as dyestuffs and pH adjustors, may properly be used.

On the occasion of producing the paper of the invention, the paper having desirable layer composition can be produced by papermaking method and order of materials composing a paper base, and installation of a surface layer in a paper base as required.

For example, magnetic fiber is disposed with dispersion on one face of a paper base layer produced by papermaking paper stuff slurry in which materials composing a paper base, such as the above-mentioned pulp fiber, are mixed, and thereafter the paper base is produced through a process of sticking another paper base layer together on the face on which this magnetic fiber is disposed, and additionally, as required, the surface of this paper base can be provided with a surface layer such as the after-mentioned pigment coating layer and coated with size press liquid.

A single-layer paper base is produced by papermaking paper stuff slurry in which materials composing a paper base, such as the pulp fiber, are blended with magnetic fiber as well, and as required, the surface of this paper base can be provided with a surface layer and coated with size press liquid. Alternatively, a paper base having three-layer composition is produced by sticking a paper base layer subject to papermaking by using paper stuff slurry containing no magnetic fiber together on both faces of a paper base layer containing magnetic fiber, and additionally, as required, the surface of this paper base can be provided with a surface layer and coated with size press liquid. In this manner, the paper may be produced by producing a paper base with the utilization of multilayer papermaking and additionally forming a surface layer.

The paper of the invention may be of single-layer composition having only one-layer paper base and yet preferably has two or more layers. In this case, a paper base itself may be composed of two or more layers, one face or both faces thereof may be provided with a surface layer, and the paper base may be of composition in combination of both.

In the case where a paper base is composed of two or more layers, the disposition of magnetic fiber at an interface between layers prevents the magnetic fiber from being exposed to a paper surface and allows the magnetic fiber to be contained in a position more inside from the paper surface. In the case where a paper base is composed of three or more layers, the inclusion of magnetic fiber in a layer or between layers except the outermost layer of the paper base allows the magnetic fiber to be contained in a position more inside from the paper surface. In this case, a layer composition is the most preferable, such that paper base has at least two or more paper base layers containing at least pulp fiber, any two of the paper base layers are laminated adjacently to each other, and the magnetic fiber is disposed at an interface between two of the paper base layers.

In view of preventing the magnetic fiber from being exposed to a paper surface and allowing the magnetic fiber to be contained in a position more inside from the paper surface, a surface layer is preferably provided, which is particularly effective in the case where a paper base is of single-layer composition.

As described above, layer composition in the thickness direction of the paper is allowed to be desirable composition by combining production processes thereof through selection as required.

A papermaking method is not particularly limited. Any of multilayer papermaking method, and conventionally known Fourdrinier paper machine, cylinder paper machine and twin wire type can be used. A papermaking method may be either of acidic and alkaline papermaking method.

Any method of multicylinder papermaking, Fourdrinier multicylinder, Fourdrinier/cylinder combination, multihead box and direct wire/Fourdrinier type may be used as a multilayer papermaking method, for example, any method described in detail in "The newest papermaking technique-theory and practice" written by Saburou Ishiguro (Papermaking Chemistry Research Institute, 1984) may be used, and orb web multicylinder type such that plural orb webs are lined up may be used.

It is desirable that magnetic fiber is not exposed to the surface of a recording paper. When magnetic fiber is exposed to the recording paper surface, a leak is occasionally caused in the transfer step of transferring a toner image formed on a photoreceptor and an intermediate transcription member to the recording paper, in the case of forming an image by electrophotography. Thus, it is desirable that magnetic fiber is not exposed to the surface of a recording paper by disposing the magnetic fiber in a layer inside a multilayered paper base and providing a coating layer.

The surface of the above-mentioned paper base (the surface of a paper base layer on the front face in the case where the paper base of the paper is composed of plural paper base layers) is preferably coated with size press liquid described below.

The following can be used as a binder used for size press liquid: modified starches such as enzyme modified starch, phosphorylated starch, cationized starch and acetylated starch, beginning with raw starches such as cornstarch, potato starch and tapioca starch. In addition thereto, water-soluble polymers and derivatives thereof, such as polyethylene oxide, polyacrylamide, sodium polyacrylate, sodium alginate, hydroxymethyl cellulose, carboxymethyl cellulose, methyl cellulose, polyvinyl alcohol, guar gum, casein and curdlan, can be used singly or by mixture and yet the binder is not limited thereto. However, more inexpensive starch is frequently used from the viewpoint of production costs.

A recording paper of the invention contains magnetic fiber having a large Barkhausen effect. Thus, in the case where the surface of the magnetic fiber is not coated with an insulating layer made of resin, metallic oxide or the like, electric resistance on the periphery of the magnetic fiber is easily decreased. Therefore, in the case of forming an image by electrophotography, on the periphery of a part in which the magnetic fiber exists in transferring a toner image formed on the surface of a photoreceptor or an intermediate transcription member, local failure of transcription is caused and consequently void of the image is occasionally caused.

From such a viewpoint, surface resistivity and volume resistivity of a recording paper are appropriately adjusted to predetermined range so as to cause void and concentration increase with difficulty. In order to perform such adjustment of electric resistance, the following electric resistance adjustors can be used for a recording paper of the invention singly or by mixture: inorganic matters such as sodium chloride, potassium chloride, calcium chloride sodium sulfate, zinc oxide, titanium dioxide, tin oxide, aluminum oxide and magnesium oxide, and organic materials such as alkyl phosphate, alkyl sulfate, sodium sulfonate and quaternary ammonium salt. Examples of a method of containing these electric resistance adjustors in the recording paper include a method such that these inorganic matters and organic materials are contained in the above-mentioned size press liquid which is applied on the above-mentioned paper base surface.

The following ordinarily used coating machines can be used as a method of applying the above-mentioned size press liquid on the above-mentioned paper base surface (the surface of a paper base layer on the front face in the case where the paper base of the paper is composed of plural paper base layers): shim size, gate roll, roll coater, bar coater, air-knife coater, rod blade coater and blade coater, in addition to size press.

In addition, a recording paper of the invention can also be used as a coated paper by coating at least one face thereof with coating solution for a pigment coating layer mainly containing adhesive and pigment to form the pigment coating layer.

In order to obtain a high-gloss image, a resin layer can also be provided on this pigment coating layer.

Resin used as a resin layer is not particularly limited if known thermoplastic resin; examples thereof include resin having ester linkage; polyurethane resin; polyamide resin such as urea resin; polysulfone resin; polyvinyl chloride resin, polyvinylidene chloride resin, vinyl chloride-vinyl acetate copolymer resin, vinyl chloride-vinyl propionate copolymer resin; polyol resin such as polyvinyl butyral, cellulosic resins such as ethyl cellulose resin and cellulose acetate resin; polycaprolactone resin, styrene-maleicanhydride resin, polyacrylonitrile resin, polyether resin, epoxy resin, phenolic resin; polyolefin resins such as polyethylene resin and polypropylene resin, copolymer resin of olefins such as ethylene and propylene, and other vinyl monomers, and acrylic resin.

Either or both of water-soluble and water-dispersible polymeric compounds are used as adhesive contained in coating solution for a pigment coating layer; for example, the following can be used: starches such as cationic starch, amphoteric starch, oxidized starch, enzyme modified starch, thermochemical modified starch, esterified starch and etherified starch, cellulose derivatives such as carboxymethyl cellulose and hydroxyethyl cellulose, naturally-occurring or semisynthetic polymeric compounds such as gelatin, casein, soybean protein and natural rubber, polydienes such as polyvinyl alcohol, isoprene, neoprene and polybutadiene, polyalkenes such as polybutene, polyisobutylene, polypropylene and polyethylene, vinyl polymers and copolymers such as vinyl halide, vinyl acetate, styrene, (meth)acrylic acid, (meth)acrylate, (meth)acrylaride and methyl vinyl ether synthetic rubber latexes such as styrene-butadiene and methyl methacrylate-butadiene, and synthetic polymeric compounds such as polyurethane resin, polyester resin, polyamide resin olefin-maleicanhydride resin and melamine resin. One kind, or two or more kinds are used through proper selection from among these in accordance with quality objectives of a recording paper.

Examples of pigment contained in coating solution for a pigment coating layer include mineral pigments such as ground calcium carbonate, precipitated calcium carbonate, kaoline, calcined kaoline, structural kaoline, delamikaoline, talc, calcium sulfate, barium sulfate, titanium dioxide, zinc oxide, alumina, magnesium carbonate, magnesium oxide, silica, magnesium aluminosilicate, particulate calcium silicate, particulate magnesium carbonate, particulate light calcium carbonate, white carbon, bentonite, zeolite, sericite and smectite, polystyrene resin, styrene-acrylic copolymer resin, urea resin, melamine resin, acrylic resin, vinylidene chloride resin, benzoguanamine resin, and hollow microparticle and through-hole organic pigments thereof, one kind, or two or more kinds are used from among these.

The blending ratio of adhesive to pigment in the above-mentioned coating solution for a pigment coating layer is preferably in a range of from approximately 5 parts by mass or more to approximately 50 parts by mass or less with respect to 100 parts by mass of pigments. When the blending ratio of adhesive to 100 parts by mass of pigments is less than approximately 5 parts by mass, the problem is that coating film intensity of the coating layer is so low as to cause paper powder. On the other hand, when the blending ratio of adhesive to 100 parts by mass of pigments is more than approximately 50 parts by mass, the adhesive is so excessive as to occasionally bring an increase in costs and low practicability.

In addition, the following various auxiliary agents can also be added properly as required to the above-mentioned coating solution for a pigment coating layer, such as surfactant, pH control agent, viscosity modifier, softening agent, gloss agent, dispersing agent, flowablity control agent modifier, conductive inhibitor, stabilizer, antistatic agent, crosslinking agent, antioxidant, sizing agent, fluorescent brightning agent, coloring agent, ultraviolet absorbing agent, antifoaming agent, insolubilizers, plasticizer, lubricant, antiseptic agent and perfume.

The coating amount of the above-mentioned coating solution for a pigment coating layer onto the above-mentioned recording paper is properly selected in accordance with intended purpose of the recording paper of the invention, and such amount as to completely cover irregularities on the recording paper surface is generally necessary. Therefore, the coating amount of the coating solution for a pigment coating layer onto the above-mentioned recording paper is preferably in a range of from approximately 2 g/m$^2$ or more to approximately 20 g/m$^2$ or less per one face in dry mass, more preferably in a range of from approximately 2 g/m$^2$ or more to approximately 8 g/m$^2$ or less in consideration of costs.

The following generally known coating machines can properly be used as a method of further applying the above-mentioned coating solution for a pigment coating layer to the above-mentioned paper base surface coated with the above-mentioned size press liquid: for example, blade coater, air-knife coater, roll coater, reverse-roll coater, bar coater, curtain coater, die coater, gravure coater, champlex coater, brush coater, two-roll or metering-blade type size press coater, bill blade coater, short dwell coater and gate roll coater.

The pigment coating layer is provided on the paper base and thereby formed as a surface layer on one face or both faces of the paper. Then, a surface layer can also be made into multilayered structure by being provided with an interlayer of one layer, or two or more layers as required. In the case where a surface layer is provided on both faces of the paper, or a surface layer is made into multilayered structure, with regard to the coating solution for forming each of the coating layers, it is not necessary that the coating amount thereof is the same and the kind and content of the above-mentioned materials contained in the coating solution are the same. Then, the coating solution is adjusted in accordance with needed quality level so as to satisfy the range prescribed in the above.

In the case where the pigment coating layer is provided on one face of the paper, curl occurrence prevention, printability, and paper feedability and deliverability can also be provided for the paper by providing a synthetic resin layer, a coating layer containing adhesive and pigment, or an antistatic layer on the other face thereof. Naturally, characteristics appropriate for various uses can also be added to the paper by further performing various kinds of processing, for example, after processing such as adhesion, magnetism, flame resistance, heat resistance, water resistance, oil resistance and slip resistance on the above-mentioned other face of the paper.

The paper of the invention is preferably produced in such a manner that the paper base surface is coated as required with the above-mentioned sizing agent, the size press liquid and the above-mentioned coating solution for a pigment coating layer, and thereafter subjected to smooth finish treatment by using smoothing devices such as super calender, gloss calender and soft calender. With regard to smoothing treatment, smoothing may be performed in on machine and off machine as required. The form of a pressure machine, the number of pressure nips and waring also prefer to be properly adjusted in conformance with ordinary smoothing treaters.

The basic weight (JIS P-8124) of the paper of the invention is not particularly limited but yet preferably approximately 60 g/m$^2$ or more. A basic weight of less than approximately 60 g/m$^2$ causes stiffness of the paper to be decreased. Thus, in forming an image by an image forming device of electrophotographic mode, the problem is that mis-stripping and peel defect of the paper are caused in a fuser machine for fusing a toner image transferred to the paper on the paper, and thereby image defect is easily caused. Similarly, when the basic weight is less than approximately 60 g/m$^2$, the problem is occasionally that the exposure of magnetic fiber contained in the paper to the recording paper surface causes visibility of image to be deteriorated.

In addition, with regard to a recording paper of the invention, degree of product moisture immediately after being opened from a state of being enclosed by moisture-proof packaging is preferably adjusted within appropriate range in moisture content by a paper machine when a paper base is subject to papermaking. In this case, specifically, the degree of product moisture is preferably in a range of from approximately 3% by mass or more to approximately 6.5% by mass or less, more preferably in a range of from approximately 4.5% by mass or more to approximately 5.5% by mass or less. It is desired that the produced recording paper is packaged in each of the predetermined number of sheets by using moisture-proof packaging paper such as polyethylene laminated paper and a material such as polypropylene so as not to cause absorption and/or dehumidification during storage of the produced recording paper.

EXAMPLES

The present invention is hereinafter described more specifically by referring to examples, and naturally the scope of the invention is not limited to examples described below.

(Production of Recording Papers A Series)

Paper stuff slurry with a solid content concentration of 0.4% by mass, containing 90 parts by mass of LBKP (freeness (CSF)=450 ml) and 10 parts by mass of NBKP (freeness (CSF)=450 ml), are prepared.

This paper stuff slurry is subjected to papermaking into a sheet with a basic weight of 40 g/m$^2$ by using an oriented sheet former (trade name: ORIENTED SHEET FORMER, manufactured by KUMAGAI RIKI KOGYO CO., LTD.) on the conditions of variously modified jet wire ratios by combining wire speed and paper stuff slurry discharge pressure as shown in Table 1.

Next a laminated sheet in which ten pieces of magnetic fiber (composition: Fe—Co—Si, a length of 30 mm, a diameter of 35 μm) having a large Barkhausen effect is put between two sheets produced at the same jet wire ratio so as to make an angle of 15° on average with the flow direction of pulp fiber in the sheet is prepared. The laminated sheet is produced with such a superposition that the flow directions of pulp fiber in two sheets correspond.

Next, the laminated sheet is pressed by a square sheet machine press (manufactured by KUMAGAI RIKI KOGYO CO., LTD.) at a pressure of 5 kgf/cm$^2$ for 10 minutes, and thereafter dried by a rotary dryer (trade name: ROTARY DRYER DR-200, manufactured by KUMAGAI RIKI KOGYO CO., LTD.) on the conditions of a drum temperature of 80° C. and a rotational speed of 120 cm/min to thereby produce recording papers A1 to A14.

The obtained recording papers are cut into A4 size so that the MD becomes the longer direction to thereafter evaluate fiber orientation ratio and degree of shrinkage (%) in the MD. The results are shown in Table 1.

(Production of Recording Papers B Series)

Paper stuff slurry with a solid content concentration of 0.4% by mass, containing 90 parts by mass of LBKP (freeness (CSF)=500 ml) and 10 parts by mass of NBKP (freeness (CSF)=480 ml), are prepared.

This paper stuff slurry is subjected to papermaking into a sheet with a basic weight of 40 g/m$^2$ by using an oriented sheet former (trade name: ORIENTED SHEET FORMER, manufactured by KUMAGAI RIKI KOGYO CO., LTD.) on the conditions of variously modified jet wire ratios by combining wire speed and paper stuff slurry discharge pressure as shown in Table 2.

Next, a laminated sheet is prepared, pressed and subjected to drying treatment in the same manner as the case of producing recording papers A series except for using the above-mentioned sheet to thereby produce recording papers B1 to B14.

The obtained recording papers are cut into A4 size so that the MD becomes the longer direction to thereafter evaluate fiber orientation ratio and degree of shrinkage (%) in the MD. The results are shown in Table 2.

(Production of Recording Papers C Series)

Paper stuff slurry with a solid content concentration of 0.4% by mass, containing 90 parts by mass of LBKP (freeness (CSF)=350 ml) and 10 parts by mass of NBKP (freeness (CSF)=350 ml), are prepared.

This paper stuff slurry is subjected to papermaking into a sheet with a basic weight of 40 g/m$^2$ by using an oriented sheet former (trade name: ORIENTED SHEET FORMER, manufactured by KUMAGAI RIKI KOGYO CO., LTD.) on the conditions of variously modified jet wire ratios by combining wire speed and paper stuff slurry discharge pressure as shown in Table 3.

Next, a laminated sheet is prepared, pressed and subjected to drying treatment in the same manner as the case of producing recording papers A series except for using the above-mentioned sheet to thereby produce recording papers C1 to C14.

The obtained recording papers are cut into A4 size so that the MD becomes the longer direction to thereafter evaluate fiber orientation ratio and degree of shrinkage (%) in the MD. The results are shown in Table 3.

—Evaluations—

A pulse signal resulting from magnetic fiber contained in the paper is measured for evaluations by using a detecting gate shown in FIG. 3 (trade name: SAS, magnetic wire type article monitoring system, manufactured by UNIPULSE CORPORATION).

Figure 3A:
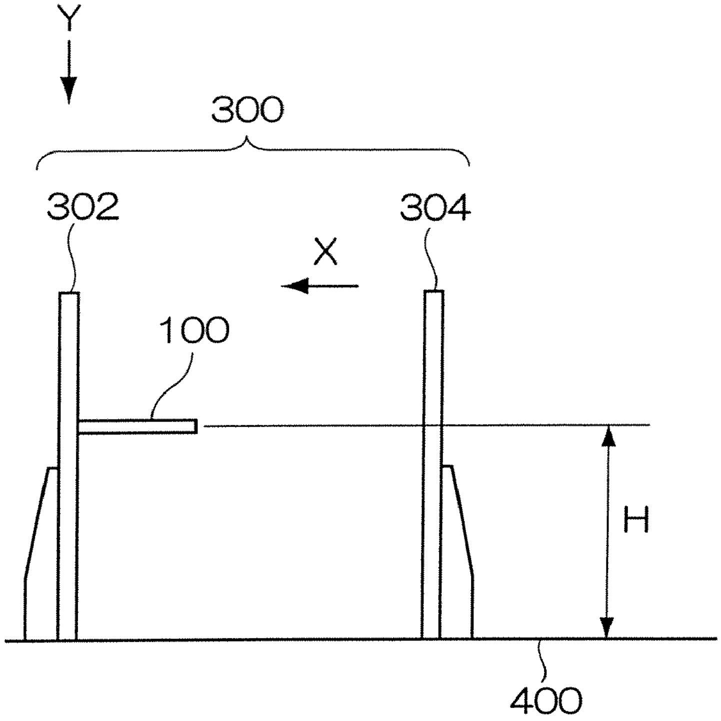
FIGS. 3A to 3C are schematic views showing a constitution of a detecting gate used for evaluating examples.
Figure 3B:
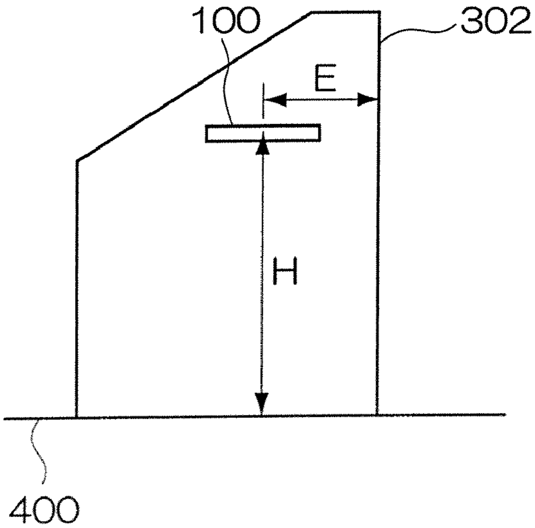
Figure 3C:
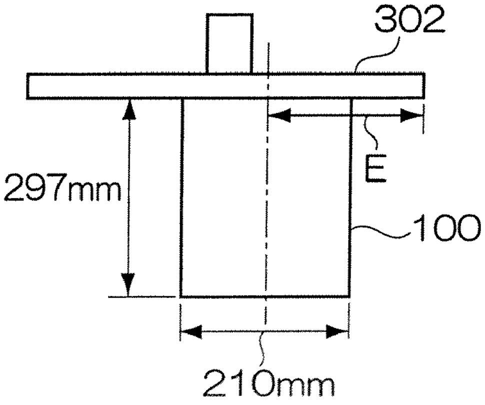

This detecting gate has a composition such that two detectors provided with an exciting coil for forming an alternating magnetic field and a detecting coil for detecting magnetization reversal of magnetic substance wire in the paper 100 are disposed in pairs. FIG. 3 is a schematic view showing a constitution of a detecting gate used for evaluating examples, FIG. 3(A) is a front view of the detecting gate, FIG. 3(B) is a side view in the case of observing one detector composing the detecting gate from a side face (in the case of observing from the arrow X direction in FIG. 3A), and FIG. 3(C) is a top view in the case of observing one detector composing the detecting gate from above (in the case of observing from the arrow Y direction in FIG. 3A). In the Figs., 100 denotes the (A4-sized) paper, 300 denotes the detecting gate, 302 denotes a first detector, 304 denotes a second detector and 400 denotes a floor face, and H denotes a height from the floor face 400 to the paper 100 and E denotes a distance from the side edge (on the long side) of the first detector 302 to the central point of the short side of the paper 100.

As shown in FIG. 3, the detecting gate 300 is composed of the first detector 302 and the second detector 304 oppositely disposed on the floor face 400. The detectors 302 and 304 have the same composition, whose height is approximately 1.5 m. The distance between the two detectors 302 and 304 is approximately 0.9 m.

Here, the measurement of a pulse signal is performed under an environment of 23° C. and 30% RH in a state such that the paper 100 is in parallel with the floor face 400 and one short side of the paper 100 is motionlessly contacted with a face of the detector 302 on the side on which the detector 304 is disposed, as shown in FIG. 3. The height H from the floor face 400 to the paper 100 is determined at 1250 mm, and the distance F from the side edge of the detector 302 to the central point of the short side of the paper 100 is determined at 200 mm. On the occasion of measuring the maximum intensity of an alternating magnetic field in a position of the height H from the floor face and the distance F from the side edge of the detecting gate 302 in a face of the detector 302 on which the paper 100 is contacted is set so as to become 9.2 Oe.

A pulse signal detected by the detecting gate 300 is taken in an oscilloscope (DL1540, manufactured by YOKOGAWA ELECTRIC CORPORATION) to regard voltage of a peak value of the pulse as a pulse value.

A pulse value of the paper before fusing (the initial pulse value) and a pulse value after forming an image by an image forming device (after-fusing pulse value) in the paper produced in each of examples and comparative examples are measured as the pulse value.

Here, the initial pulse value is measured after controlling in humidity the paper before an image forming test under an environment of 23° C. and 50% RH for 12 hours or more.

The after-fusing pulse value is measured in such a manner that the paper controlled in humidity before an image forming test under an environment of 23° C. and 50% RH for 12 hours or more is subjected to double-sided printing of a blank paper image in plain paper A mode and full-color mode by an image forming device (DocuCentreColor f450, manufactured by FUJI XEROX CO., LTD.), and then the paper after finishing double-sided printing is moved to the detecting gate 300 and disposed in a state shown in FIG. 3.

Here, the after-fusing pulse value signifies a pulse value measured in 30 seconds from a point of time immediately after double-sided printing of the paper is finished and ejected from the image forming device (immediately after second-time fusing).

The reason why a pulse value is measured in 30 seconds immediately after second-time fusing is to assume a typical case such that in an office where the detecting gate is disposed at the doorway of a room where the image forming device is disposed, a human being who output an image by the image forming device moves out of the room immediately afterward with the paper on which the image is output.

Then, pulse value variation T (%) is calculated from the initial pulse value and the after-fusing pulse value on the basis of the following expression (3). The results are shown in Tables 1 to 3.

$$\text{pulse value variation } T=(\text{after-fusing pulse value}/\text{initial pulse value})\times 100 \qquad \text{Expression (3)}$$

It is conceived that smaller pulse value variation T brings a tendency to deteriorate detection accuracy of the paper more.

The criterion of evaluation grades shown in Tables 1 to 3 is as follows.

A: T is 60 or more and 100 or less

B: T is 40 or more and less than 60

C: T is less than 40

Figure 4:
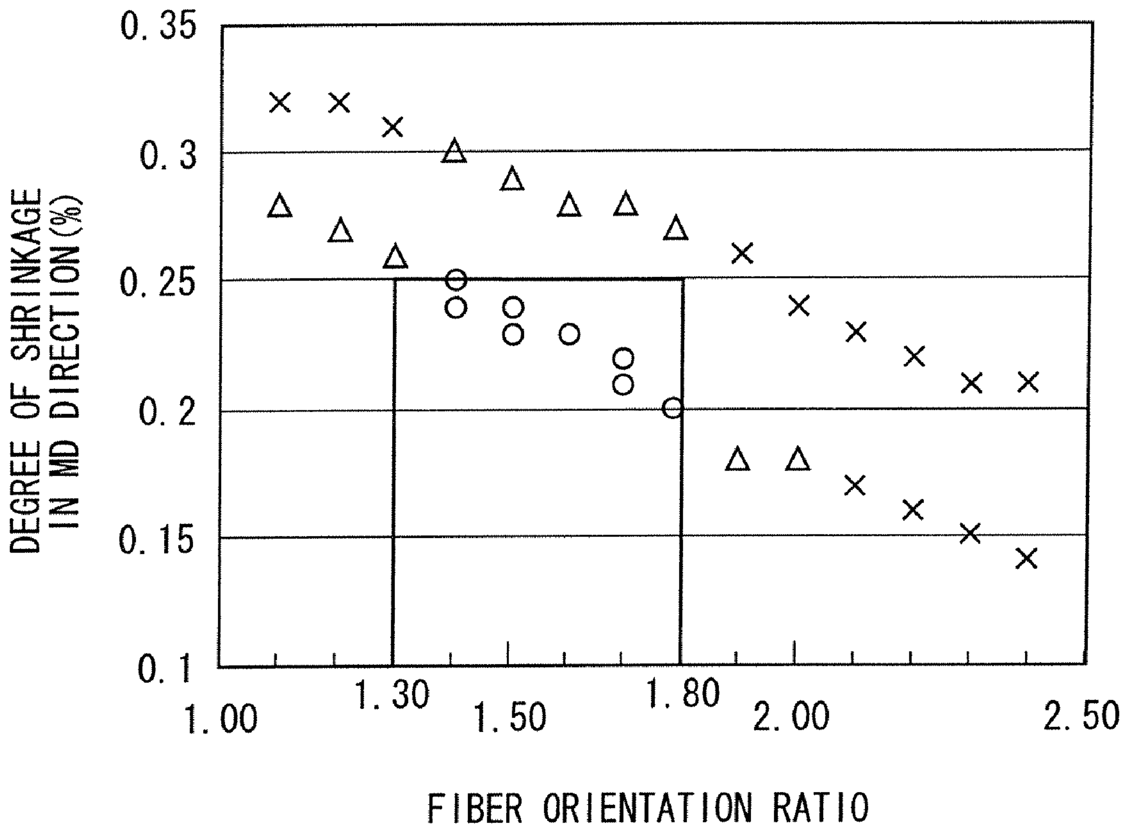
FIG. 4 is a graph showing a result of plotting a difference in pulse value variation T among papers of each of the examples and comparative examples with division into three levels, according to fiber orientation ratio and degree of shrinkage in an MD.

The result of plotting a difference in pulse value variation T among the papers of each of examples and comparative examples with division into three levels, according to fiber orientation ratio and degree of shrinkage in the MD is shown in FIG. 4. As clarified from FIG. 4, it is found that the papers of examples, in which fiber orientation ratio is more than 1.3 and less than 1.8 and degree of shrinkage in the MD is 0.25% or less, is relatively high in values of pulse value variation T as compared with the papers of comparative examples.

In FIG. 4, a horizontal axis denotes fiber orientation ratio and a vertical axis denotes degree of shrinkage in the MD; in FIG. 4, '○ (circular mark)' signifies fiber orientation ratio-degree of shrinkage in the MD in the papers of examples, in which T is 60 or more and 100 or less, 'Δ (triangular mark)' signifies fiber orientation ratio-degree of shrinkage in the MD in the papers of comparative examples, in which T is 40 or more and less than 60, and 'X (cross mark)' signifies fiber orientation ratio-degree of shrinkage in the MD in the papers of comparative examples, in which T is less than 40.

TABLE 1

| | Paper kinds | Wire speed V (m/min) | Paper stuff slurry discharge pressure P ($kg/cm^2$) | Fiber orientation ratio | Degree of shrinkage in MD (%) | Pulse value variation T (%) | Evaluations |
|---|---|---|---|---|---|---|---|
| Comparative example A1 | A1 | 600 | 1.4 | 1.10 | 0.28 | 41 | B |
| Comparative example A2 | A2 | 600 | 1.3 | 1.20 | 0.27 | 51 | B |
| Comparative example A3 | A3 | 600 | 1.2 | 1.29 | 0.26 | 58 | B |
| Example A1 | A4 | 800 | 1.2 | 1.40 | 0.25 | 84 | A |
| Example A2 | A5 | 800 | 1.1 | 1.50 | 0.23 | 92 | A |
| Example A3 | A6 | 800 | 1.0 | 1.60 | 0.23 | 100 | A |
| Example A4 | A7 | 1000 | 0.9 | 1.70 | 0.22 | 85 | A |
| Example A5 | A8 | 1000 | 0.8 | 1.79 | 0.20 | 82 | A |
| Comparative example A4 | A9 | 1100 | 0.7 | 1.90 | 0.18 | 50 | B |
| Comparative example A5 | A10 | 1200 | 0.6 | 2.00 | 0.18 | 41 | B |
| Comparative example A6 | A11 | 1300 | 0.6 | 2.10 | 0.17 | 33 | C |
| Comparative example A7 | A12 | 1400 | 0.6 | 2.20 | 0.16 | 32 | C |
| Comparative example A8 | A13 | 1500 | 0.6 | 2.30 | 0.15 | 30 | C |
| Comparative example A9 | A14 | 1500 | 0.5 | 2.40 | 0.14 | 22 | C |

TABLE 2

| | Paper kinds | Wire speed V (m/min) | Paper stuff slurry discharge pressure P ($kg/cm^2$) | Fiber orientation ratio | Degree of shrinkage in MD (%) | Pulse value variation T (%) | Evaluations |
|---|---|---|---|---|---|---|---|
| Comparative example B1 | B1 | 600 | 1.45 | 1.10 | 0.28 | 40 | B |
| Comparative example B2 | B2 | 600 | 1.35 | 1.20 | 0.27 | 50 | B |
| Comparative example B3 | B3 | 600 | 1.25 | 1.29 | 0.26 | 59 | B |
| Example B1 | B4 | 800 | 1.25 | 1.40 | 0.24 | 85 | A |
| Example B2 | B5 | 800 | 1.15 | 1.50 | 0.24 | 100 | A |
| Example B3 | B6 | 800 | 1.05 | 1.60 | 0.23 | 99 | A |
| Example B4 | B7 | 1000 | 0.95 | 1.70 | 0.21 | 90 | A |
| Example B5 | B8 | 1000 | 0.85 | 1.79 | 0.20 | 84 | A |
| Comparative example B4 | B9 | 1100 | 0.75 | 1.90 | 0.18 | 50 | B |
| Comparative example B5 | B10 | 1200 | 0.65 | 2.00 | 0.18 | 45 | B |
| Comparative example B6 | B11 | 1300 | 0.65 | 2.10 | 0.17 | 36 | C |
| Comparative example B7 | B12 | 1400 | 0.65 | 2.20 | 0.16 | 35 | C |
| Comparative example B8 | B13 | 1500 | 0.65 | 2.30 | 0.15 | 29 | C |
| Comparative example B9 | B14 | 1500 | 0.55 | 2.40 | 0.14 | 20 | C |

TABLE 3

| | Paper kinds | Wire speed V (m/min) | Paper stuff slurry discharge pressure P ($kg/cm^2$) | Fiber orientation ratio | Degree of shrinkage in MD (%) | Pulse value variation T (%) | Evaluations |
|---|---|---|---|---|---|---|---|
| Comparative example C1 | C1 | 600 | 1.3 | 1.10 | 0.32 | 18 | C |
| Comparative example C2 | C2 | 600 | 1.2 | 1.20 | 0.32 | 19 | C |

TABLE 3-continued

| | Paper kinds | Wire speed V (m/min) | Paper stuff slurry discharge pressure P ($kg/cm^2$) | Fiber orientation ratio | Degree of shrinkage in MD (%) | Pulse value variation T (%) | Evaluations |
|---|---|---|---|---|---|---|---|
| Comparative example C3 | C3 | 600 | 1.1 | 1.29 | 0.31 | 25 | C |
| Comparative example C4 | C4 | 800 | 1.1 | 1.40 | 0.30 | 41 | B |
| Comparative example C5 | C5 | 800 | 1.0 | 1.50 | 0.29 | 44 | B |
| Comparative example C6 | C6 | 800 | 0.9 | 1.60 | 0.28 | 50 | B |
| Comparative example C7 | C7 | 1000 | 0.8 | 1.70 | 0.28 | 52 | B |
| Comparative example C8 | C8 | 1000 | 0.7 | 1.79 | 0.27 | 41 | B |
| Comparative example C9 | C9 | 1100 | 0.6 | 1.90 | 0.26 | 30 | C |
| Comparative example C10 | C10 | 1200 | 0.5 | 2.00 | 0.24 | 25 | C |
| Comparative example C11 | C11 | 1300 | 0.5 | 2.10 | 0.23 | 23 | C |
| Comparative example C12 | C12 | 1400 | 0.5 | 2.20 | 0.22 | 21 | C |
| Comparative example C13 | C13 | 1500 | 0.5 | 2.30 | 0.21 | 20 | C |
| Comparative example C14 | C14 | 1500 | 0.4 | 2.40 | 0.21 | 17 | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording paper comprising a pulp fiber and a magnetic fiber having a large Barkhausen effect, a fiber orientation ratio measured by an ultrasonic propagation velocity method being in a range of from more than approximately 1.4 to less than approximately 1.8, and a degree of shrinkage in a MD being in a range of from approximately 0.20% to 0.25%.

2. The recording paper according to claim 1, wherein the fiber orientation ratio is in a range of from approximately 1.4 to approximately 1.7.

3. The recording paper according to claim 1, wherein the degree of shrinkage in a MD is in a range of from approximately 0.20% to 0.24%.

4. The recording paper according to claim 1, wherein the freeness of the pulp fiber is approximately 400 ml or more.

5. The recording paper according to claim 1, wherein the freeness of the pulp fiber is approximately 450 ml or more.

6. The recording paper according to claim 1, wherein the length of the magnetic fiber having the large Barkhausen effect is in a range of from approximately 10 mm to approximately 350 mm, and the diameter thereof is in a range of from approximately 10 μm to approximately 80 μm.

7. The recording paper according to claim 1, further comprising a paper base containing the pulp fiber and the magnetic fiber, wherein the paper base is composed of two paper base layers, and the magnetic fiber is disposed at an interface between the two paper base layers.

* * * * *